3,200,118
SPIROCYCLIC HYDRAZINE IMIDES
Charles H. Grogan, Falls Church, Va., and Leonard M. Rice, Baltimore, Md., assignors to The Geschickter Fund for Medical Research, Washington, D.C., a corporation of New York
No Drawing. Filed Oct. 31, 1961, Ser. No. 148,862
6 Claims. (Cl. 260—247.2)

This invention relates to novel synthetic organic compounds having significant pharmacological activity, particularly pharmacological activity producing effects on the nervous and cardiovascular systems. More specifically, this invention relates to derivatives of hydrazine in which a portion of the hydrazine molecule, namely one nitrogen atom, is combined into a cyclic ring structure, said cyclic ring structure being further characterized in that it is an azaspirane structure.

A primary object of this invention is to provide novel synthetic organic compounds having significant pharmacological activity producing effects on the nervous and cardiovascular systems.

Another object of this invention is to provide N-amino azaspirane diones, N-aminoazaspiranes and methods for synthesizing these novel types of compounds.

Another and equally important object is to provide novel N-amino azaspirane diones and N-aminoazaspiranes having pharmacological properties which render them valuable as medicinal products.

These and other objects and advantages of the present invention will become more apparent upon reference to the ensuing description and appended claims.

Formula 1 depicts the general structural formula of one class of the novel compounds of the present invention, the N-aminoazaspirane diones:

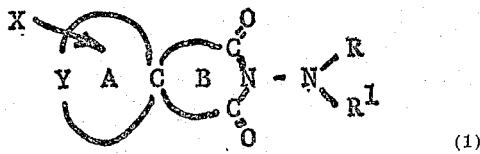

(1)

In this formula, the novel N-aminoazaspirane dione structure consists of six essential elements: (a) the ring A; (b) the ring B; (c) the spiro carbon atom connecting rings A and B; (d) the substituent X on ring A; (e) the constituent Y in ring A; and (f) the substituent

on ring B.

Ring A comprises a mono or polycyclic ring system of at least 5 atoms. While there is no particular limit on the number of atoms in ring A, a ring of from 5–15 atoms is preferred. Ring B comprises a heterocyclic ring of 5 or 6 atoms, one of which is nitrogen, the two carbonyl carbons being adjacent to the nitrogen atom. The other atoms of ring B are preferably carbon atoms. Element (c) is a spiro carbon atom connecting ring structures A and B. Element (d), namely the substituent X on ring A, represents one or more atoms and/or radicals of the group consisting of hydrogen, alkyl, alkenyl, alkoxy, aryl and cycloalkyl. While the invention is not so restricted, the alkyl, alkenyl and alkoxy radicals preferably contain no more than 6 atoms in their chain. Constituent Y in ring A is an atom selected from the group consisting of carbon, oxygen and sulfur. In element (f), R and $R^1$ are substituents on the exocyclic nitrogen atom selected from the group consisting of alkyl, alkenyl, cycloalkyl and aryl containing up to 10 carbon atoms. R and $R^1$ may be the same group or any combination of the groups listed above. For example, R and $R^1$ may be selected so that the following combinations of groups are on the exocyclic nitrogen portion of the hydrazine molecule: dimethyl, dihexyl, methyl-allyl, diallyl, methyl-phenyl, diphenyl, ethyl-cyclohexyl, dicyclohexyl, methyl-p-chlorophenyl, di-p-chlorophenyl, etc. In addition to the above, the grouping

may be selected from the group consisting of morpholine, pyrrolidine, piperidine, piperazine, and their lower alkyl substituted derivatives.

Generally speaking, any alkyl, alkenyl, cycloalkyl and aryl group may be selected for R and $R^1$ within the limits set forth above, provided only that the solubility and chemical stability of the reactant containing the

substituent is such as to permit that reactant to react under the prevailing reaction conditions to form the desired dione structures.

The N-substituted-N-aminoazaspirane diones may be reduced by suitable means to yield the corresponding N-aminoazaspirane bases shown by Formula 2:

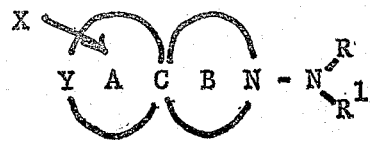

(2)

In this formula, the same significance is attached to all of the symbols used to define the structure of the diones shown by Formula 1. The only difference between Formula 1 and Formula 2 is that the latter has had the oxygen atoms removed from the carbonyl groups by reduction.

Generally speaking, the novel compounds of the present invention are obtained by reacting the appropriate N,N-disubstituted hydrazine or N-amino heterocycle with an anhydride selected from the group consisting of mono or polycyclic gem-carboxy acetic and gem-diacetic anhydrides and cyclizing the initially formed amic acid to the desired dione. The process is illustrated by the following equation:

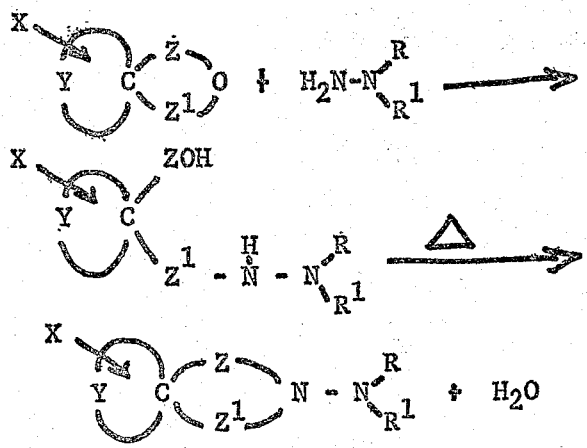

From this equation it will be seen that the anhydride, in which one or both of Z and $Z^1$ may be acetyl, depending on whether or not one is using a carboxy-acetic or diacetic anhydride, is reacted with the hydrazine. The reaction is exothermic and the anhydride ring is ruptured to form the amic acid which, on heating to an appropriate temperature, loses water and undergoes ring closure to form the desired azaspirane dione. The temperature generally required to effect such ring closure is in the range of 140–220° C., a range of 180–220° C. being preferred.

The following hydrazines may be cited by way of illustrating some of these that may be employed as one of the reactants in the general synthesizing procedure: N,N-dimethyl; N,N-diethyl; N,N-dihexyl; N,N-dibutyl; N-methyl-N-hexyl; N,N-diphenyl; N-cyclohexyl-N-methyl; N,N-dicyclohexyl; N-amino-4-methyl piperazine; N-aminomorpholine; N-aminopyrrolidine; N-aminopiperidine; N-amino-2-methylpiperidine; N-amino-3,5 - dimethylmorpholine; N-amino - 2,6 - dimethylmorpholine; etc. Likewise a wide variety of cyclic gem-carboxy-acetic and gem-diacetic anhydrides may be employed as a reactant. Illustrative of some of these are the following: cyclohexane-1-carboxy-1-acetic; cyclohexane-1,1-diacetic; 3-methylcyclohexane-1-carboxy-1-acetic; 3 - methylcyclohexane - 1,1 - diacetic; 3-allyl-cyclohexane-1-carboxy-1-carboxy - 1,1 - diacetic; 4-methylcyclohexane-1-carboxy-1-acetic; 4-methylcyclohexane-1,1-diacetic; 4-methoxycyclohexane-1-carboxy-1-acetic; 4-methoxycyclohexane-1,1-diacetic 4-t-butylcyclohexane-1-carboxy-1-acetic; 4 - t - butylcyclohexane-1,1-diacetic; 4-cyclohexylcyclohexane-1-carboxy-1-acetic; 4-cyclohexylcyclohexane-1,1-diacetic; cyclopentane-1-carboxy - 1 - acetic; cyclopentane - 1,1 - diacetic; 3-methylcyclopentane - 1 - carboxy - 1 - acetic; 3- methylcyclopentane - 1,1 - diacetic; cycloheptane - 1 - carboxy-1-acetic; cycloheptane-1,1-diacetic; cyclooctane-1-carboxy-1 - acetic; cyclopentadecane - 1 - carboxy-1-acetic; trans-hexahydrohydrindene-2-carboxy-2-acetic; trans - hexahydrohydrindene-2,2-diacetic; 4 - phenylcyclohexane-1-carboxy - 1 - acetic; 3 - triacyclopentane - 1 - carboxy-1 - acetic; 3 - thiacyclopentane - 1,1 - diacetic; 4-triacyclohexane-1-carboxy 1-acetic; 4-thiacyclohexane-1,1-diacetic; 4-oxacyclohexane-1-carboxy-1-acetic; 4-oxacyclohexane-1,1-diacetic; 3,5 dimethyl-4-oxycyclohexane-1-carboxy-1-acetic; 3-methyl-5-phenyl-4-oxacyclohexane-1-carboxy-1-acetic; 3,5-dimethyl-4-oxacyclohexane-1,1-diacetic anhydrides.

The foregoing substances, listed by way of illustration of the substances that may be used as reactants in the foregoing equation, are intended to be illustrative of the wide scope of the reactants employable and products obtained therefrom, but are in no way intended to be restrictive.

In addition to the azaspiranes and azaspirane diones set forth above in Formulae 1 and 2, the instant invention additionally contemplates the treatment of the basic azaspiranes to form simple acid addition and quaternary salts. Formulae 3 and 4 illustrate the type and site of salt formation resulting from the appropriate treatment of the azaspirane bases of the present invention:

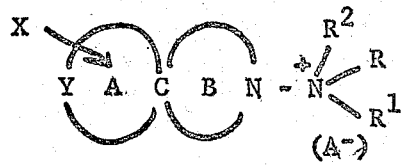

(3)

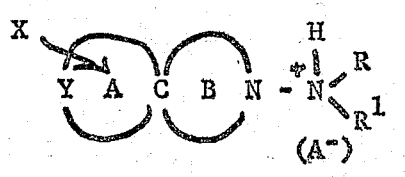

(4)

Formula 4 illustrates the simple salt formation resulting from the salting of the basic azaspiranes with non- toxic acid anions, such as chloride, iodide, bromide, sulfate, acetate, succinate, maleate, phosphate, benzoate, lactate, thiodisalicylate, mucate, citrate, tartrate and the like. In general, those non-toxic salts of the basic azaspiranes which are soluble in water or otther well-tolerated solvents are particularly useful for therapeutic purposes due to the ease of administration of the salts in their dissolved form. In addition, other non-toxic salts may also be used.

Formula 3 illustrates quaternary salt formation resulting from quaternizing the basic azaspiranes with alkyl esters. As shown, $R^2$ represents an alkyl, alkoxyalkyl or alkenyl radical of 1 to 22 chain atoms. The anion, $A^-$, may be any of the non-toxic anions useful informing the simple acid addition salts as discussed above in connection with Formula 4.

The compounds illustrated by Formulae 1–4 have been shown to possess pharmacological activity affecting the nervous and cardiovascular systems. Specifically, the diones possess in varying degrees anesthetic and hypotensive properties and, at the same time, an extremely low toxicity. This combination of activity and low toxicity renders them therapeutically valuable. Another useful property of the compounds of this group, in which the azaspirane structure is small and the exocyclic nitrogen substituents are small groups, is their extremely large range of solubility. This was a rather unexpected property since, in addition to being soluble in nearly all organic solvents, the smaller molcules are soluble in petroleum ether to a moderate extent and are considerably soluble in warm (30–60° C.) petroleum ether. At the same time, they are moderately soluble in cold water and very soluble in warm water. This combination of solubility in hydrophobic as well as hydrophilic media permits these compounds to be distributed widely in both types of media in physiological systems.

By way of illustration, the compound 2-dimethylamino-2-azaspiro[4.4]nonane-1,3-dione (Example I) may be dissolved in sterile water or isotonic saline and administered in aqueous medium as a topical or local anesthetic by injection of the 1 or 2% solution. The pH of these aqueous solutions is nearly neutral. Alternatively, the compound may be dissolved in oily vehicles for depot activity or may be administered while dissolved in propylene glycol, ethanolamine-water, N-ethylethanolamine water, or other media suitable for intravenous, intramuscular or subcutaneous administration.

The compound of Example II, when administered intravenously or intramuscularly, produces a gradual and prolonged depression of the blood pressure without noticeable ganglioplegic effects. The compound also produces prolonged depression of the blood pressure without ganglioplegic effects when administered orally.

The free bases and their acid addition and quaternary salts possess in varying degree anti-inflammatory and antihistaminic properties. They may be administered in doses of 25–100 mg. orally or intramuscularly one to two times daily.

The following examples illustrate the method of preparation of the compounds of the present invention:

EXAMPLE I

A. *2-dimethylamino-2-azaspiro[4.4]nonane-1,3-dione*

When 15.4 gm. (0.1 mole) of cyclopentane-1-carboxy-1-acetic acid anhydride was treated with an excess of unsym. dimethylhydrazine, the excess hydrazine boiled off and the resultant mixture heated to 180° C. slowly over a period of 1 hour, there was obtained a 97% yield of the title compound which boiled at 89–97° C./0.1 mm. and melted at 54–55° C. Recrystallization from ligroin gave long needles with M.P. 55–56° C.

B. *The hydrochloride*

The above imide, when dissolved in ether and treated with gaseous hydrogen chloride, gave an immediate precipitate. This was filtered and dried with suction. As initially precipitated it melted at 84–87° C. The hydrochloride is unstable and gradually loses hydrogen chloride and reverts to the original imide. On drying in vacuo or in an oven, the process of decomposition is accelerated. On vacuum drying, all that is recovered is the original imide which sublimes during drying and is completely devoid of the hydrochloride salt in a few hours.

EXAMPLE II

*3-dimethylamino-3-azaspiro[5.5]undecane-2,4-dione*

Reaction of 18.2 gm. (0.1 mole) of cyclohexane-1,1-diacetic acid anhydride with excess dimethyl hydrazine as described in Example I yielded the title compound in 98% yield with a melting point of 118–120° C. Recrystallization from water gave a product with a M.P. of 118.5–119.5° C.

EXAMPLE III

A. *3-dimethylamino-3-azaspiro[5.5]undecane*

Reduction of 20 gm. of the imide from Example II with lithium aluminum hydride in anhydrous ether yielded the title base in 85% yield with a boiling point of 73–75° C./0.1 mm.

B. *The hydrochloride*

The base hydrochloride, formed by treating an ether solution of the base in anhydrous ether with gaseous hydrogen chloride, melted at 208–211° C. Recrystallization from ethanol-ether gave a product with a M.P. of 210–211° C.

EXAMPLE IV

*2-dimethylamino-7,9-dimethyl-8-oxa-2-azaspiro[5.4]decane-1,3-dione*

Reaction of 10 gm. (0.05 mole) of the anhydride of 3,5-dimethyl-4-oxacyclohexane-1-carboxy-1-acetic acid with unsym. dimethylhydrazine as described in Example I gave the title compound in 95% yield (B.P. 125–130° C./0.1 mm.; M.P. 119–123° C.). Recrystallization from ligroin gave a product with a M.P. of 121–122° C.

EXAMPLE V

*2-dimethylamino-2-azaspiro[7.4]dodecane-1,3-dione*

Reaction of 12 gm. (0.06 mole) of the anhydride of cyclooctane-1-carboxy-1-acetic acid with unsym. dimethylhydrazine as described in Example I gave the title imide in 98% yield (B.P. 108–112° C./0.15 mm.).

EXAMPLE VI

*3-dimethylamino-3-azaspiro[4.5]decane-2,4-dione*

Reaction of 10 gm. (0.06 mole) of the anhydride of cyclopentane-1,1-diacetic acid with excess unsym. dimethylhydrazine as described in Example I yielded the title imide quantitatively with a M.P. of 52–54° C. Recrystallization from petroleum ether gave a product with a M.P. of 61–62.5° C.

EXAMPLE VII

*2-dimethylamino-2-azaspiro[5.4]decane-1,3-dione*

Reaction of the anhydride of cyclohexane-1-carboxy-1-acetic acid with unsym. dimethylhydrazine as described in Example I yielded the title imide quantitatively with a M.P. of 94–102° C. Recrystallization from petroleum ether gave a product with a M.P. of 103–104° C.

EXAMPLE VIII

*2-dimethylamino-7-thia-2-azaspiro[4.4]nonane-1,3-dione*

Reaction of 10 gm. (0.058 mole) of 3-thiacyclopentane-1-carboxy-1-acetic acid anhydride and an excess of unsym. dimethyl hydrazine as described in Example I gave a quantitative yield of the title compound (M.P. 86–92° C.). Two recrystallizations from acetone-petroleum ether gave a product with a M.P. of 94–94.5° C.

EXAMPLE IX

*3-dimethylamino-9-t-butyl-3-azaspiro[5.5]undecane-2,4-dione*

This compound was prepared in quantitative yield as described in Example I from the anhydride of 4-t-butylcyclohexane-1,1-diacetic acid and excess unsym. dimethyl hydrazine and melted at 118–119° C.

EXAMPLE X

*2-dimethylamino-2-azaspiro[6.4]undecane-1,3-dione*

The title compound was obtained in quantitative yield as described in Example I from the anhydride of cycloheptane-1-carboxy-1-acetic acid and excess unsym. dimethyl hydrazine and melted at 89–90° C.

EXAMPLE XI

*Spiro-trans-decalin-2,4'-piperidine-1'-dimethyl amino-2',6'-dione*

This compound was obtained in quantitative yield from the anhydride of trans-decalin-2,2-diacetic acid and unsym. dimethyl hydrazine as described in Example I and melted at 102–103° C.

EXAMPLE XII

*2-dimethylamino-7-methyl-2-azaspiro[4.4]nonane-1,3-dione*

This compound was obtained in 90% yield from the reaction of the anhydride of 3-methyl cyclopentane-1-carboxy-1-acetic acid and excess unsym. dimethyl hydrazine. It boiled at 88–90° C./0.15 mm. and melted at 45–46° C.

EXAMPLE XIII

*2-morpholino-2-azaspiro[4.4]nonane-1,3-dione*

This compound was obtained by the reaction of N-aminomorpholine and the anhydride of cyclopentane-1-carboxy-1-acetic acid in quantitative yield and melted at 151–152° C.

EXAMPLE XIV

*2-morpholino-2-azaspiro[4.4]nonane-1,3-dione*

This compound was obtained in quantitative yield as in Example XIII, using N-aminopiperidine in lieu of N-aminomorpholine, and melted at 79–80° C.

EXAMPLE XV

*3-piperidino-3-azaspiro[5.5]undecane-2,4-dione*

This compound was obtained in quantitative yield as in Example XIV from N-aminopiperidine and the anhydride of cyclohexane-1,1-diacetic acid (M.P. 120–121° C.).

EXAMPLE XVI

*2-piperidino-2-azaspiro[6.4]undecane-1,3-dione*

This compound was obtained in quantitative yield from N-aminopiperidine and the anhydride of cycloheptane-1-carboxy-1-acetic acid as described in Example I and melted at 118–119° C.

EXAMPLE XVII

*2-(2,6-dimethylmorpholino)-7-methyl-2-azaspiro[4.4]nonane-1,3-dione*

This compound was obtained in quantitative yield from the reaction of the anhydride of 3-methylcyclopentane-1-carboxy-1-acetic acid and N-amino-2,6-dimethyl morpholine and melted at 74–75° C.

EXAMPLE XVIII

*2-(2,6-dimethylmorpholino)-2-azaspiro[6.4]undecane-1,3-dione*

This compound was obtained as in Example XVII from the anhydride of cycloheptane-1-carboxy-1-acetic acid in quantitative yield and melted at 109–110° C.

EXAMPLE XIX
*2-dibutylamino-2-azaspiro[4.4]nonane-1,3-dione*

This compound was obtained in 86% yield from reaction of unsym. di-n-butyl hydrazine and the anhydride of cyclopentane-1-carboxy-1-acetic acid and boiled at 130–135° C./0.18 mm.

EXAMPLE XX
*2-pyrrolidino-2-azaspiro[4.4]nonane-1,3-dione*

This compound was obtained in quantitative yield as in Example I using the anhydride of cyclopentane-1-carboxy-1-acetic acid and N-amino pyrrolidine and melted at 115–116° C.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A compound of the formula

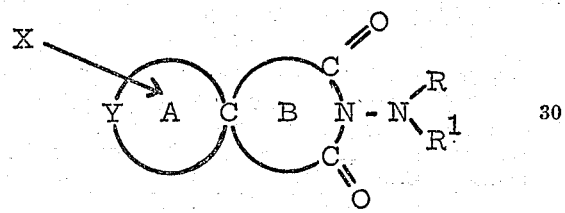

wherein A is selected from the group consisting of mono and polycyclic rings of at least five ring atoms, said ring atoms other than Y being carbon; Y is selected from the group consisting of C, O and S; X is at least one of the group consisting of hydrogen, lower alkyl, lower alkenyl, lower alkoxy, cycloalkyl of up to 6 ring atoms and monocarbocyclic aryl; B is a saturated ring of 5–6 atoms whose ring atoms other than the nitrogen atom are carbon atoms; and R and $R^1$ are selected from the group consisting of lower alkyl, lower alkenyl, cycloalkyl of up to 6 ring atoms and monocarbocyclic aryl of up to 10 carbon atoms, and, together with the nitrogen atom to which they are attached, form a member selected from the group consisting of morpholino, pyrrolidino, piperidino and piperazino.

2. 2-dimethylamino-2-azaspiro(4.4)nonane-1,3-dione.
3. 3-dimethylamino-3-azaspiro(5.5)undecane-2,4-dione.
4. 2-dimethylamino-2-azaspiro(7.4)dodecane-1,3-dione.
5. 2-morpholino-2-azaspiro(4.4)nonane-1,3-dione.
6. 2-piperidino-2-azaspiro(4.4)nonane-1,3-dione.

References Cited by the Examiner
UNITED STATES PATENTS

| | | | |
|---|---|---|---|
| 2,953,562 | 9/60 | Schuler et al. | 260—247.2 |
| 2,980,674 | 4/61 | Alberti et al. | 260—247.2 |
| 3,000,895 | 9/61 | Frankel | 260—293 |
| 3,010,965 | 11/61 | Elpern | 260—293 |

NICHOLAS S. RIZZO, *Primary Examiner.*

IRVING MARCUS, *Examiner.*

UNITED STATES PATENT OFFICE
CERTIFICATE OF CORRECTION

Patent No. 3,200,118                                           August 10, 1965

Charles H. Grogan et al.

It is hereby certified that error appears in the above numbered patent requiring correction and that the said Letters Patent should read as corrected below.

Column 3, lines 24 and 25, strike out "-1-carboxy"; line 38, for "triacyclopentane" read -- thiacyclopentane --; line 39, for "4-triacyclo-" read -- 4-thiacyclo- --; column 4, line 5, for "otther" read -- other --; line 29, for "molcules" read -- molecules --; same column 4, line 69, for "89-97° C." read -- 89-91° C. --; column 6, line 42, for "2-morpholino-", in italics, read -- 2-piperidino- --, in italics.

Signed and sealed this 1st day of February 1966.

(SEAL)
Attest:

ERNEST W. SWIDER                                         EDWARD J. BRENNER
Attesting Officer                                                Commissioner of Patents